(No Model.)

E. D. WEYBURN.
PORTABLE ELECTRIC MOTOR AND CLOTH CUTTING MACHINE.

No. 442,654. Patented Dec. 16, 1890.

Witnesses:
J. Halpenny.
David Stevens.

Inventor:
Elbert D. Weyburn
By Gridley & Fletcher
his Attys.

THE NORRIS PETERS CO., PHOTO-LITHO., WASHINGTON, D. C.

UNITED STATES PATENT OFFICE.

ELBERT D. WEYBURN, OF CHICAGO, ILLINOIS, ASSIGNOR TO THE WEYBURN SPECIAL MACHINE COMPANY, OF SAME PLACE.

PORTABLE ELECTRIC MOTOR AND CLOTH-CUTTING MACHINE.

SPECIFICATION forming part of Letters Patent No. 442,654, dated December 16, 1890.

Application filed April 5, 1890. Serial No. 346,744. (No model.)

*To all whom it may concern:*

Be it known that I, ELBERT D. WEYBURN, of Chicago, in the county of Cook and State of Illinois, have invented a new, useful, and Improved Portable Motor and Cloth-Cutting Machine, of which the following is a full, clear, and exact description, reference being had to the accompanying drawings, forming a part of this specification, in which—

Figure 1:
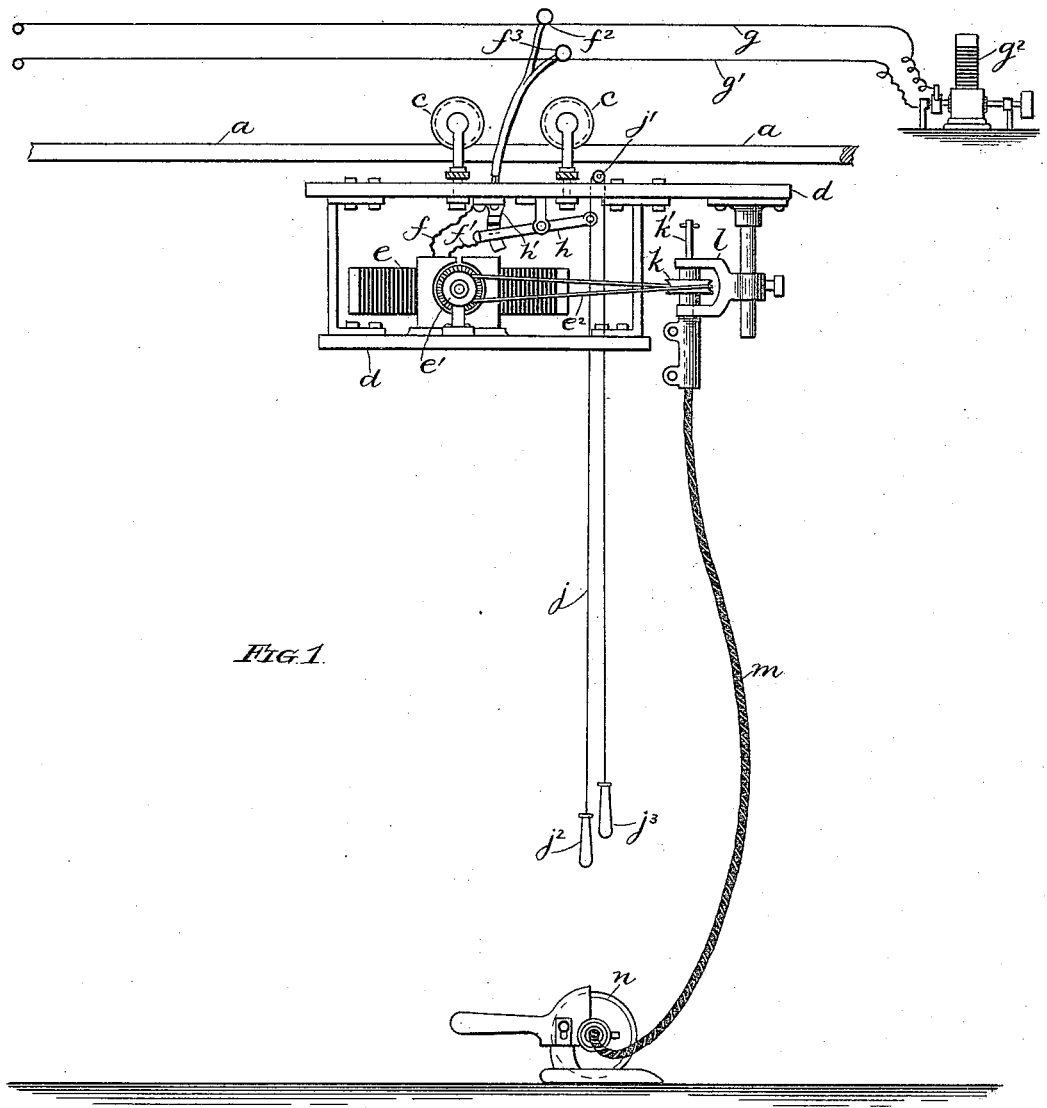
Figure 2:
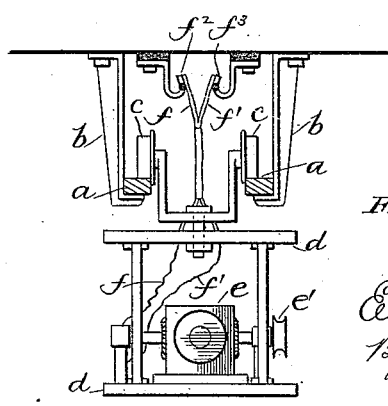

Figure 1 is a side view of said portable motor as it appears when suspended from a track in operative connection with a stationary motor and a cloth-cutter; and Fig. 2 is an end view of said motor and the tracks upon which it is suspended, the latter being shown in section.

Like letters of reference in the different figures indicate like parts.

In cloak and other factories for the making of garments it is customary to have a number of tables upon which the cloth is arranged and marked in patterns, after which it is transferred to and secured upon the cutting-table, where the usual cutting-machine is located. This involves a considerable loss of time as well as the employment of a number of workmen.

The object of my invention is to overcome this difficulty and to so construct a traveling motor in combination with a cloth-cutting machine that the cloth-cutter may be transferred from table to table indefinitely, and the cloth cut upon the different tables as fast as the patterns are marked thereon without necessitating a transfer of the goods, all of which is hereinafter more particularly described, and definitely pointed out in the claims.

Referring to the drawings, $a\ a$ indicate suspended track-rails secured to the ceiling of a room by means of brackets $b\ b$, Fig. 2, the rails being either in a straight line throughout the length of or arranged around an entire room, according as may be found most desirable to meet the requirements of each case. Suspended from the tracks $a$ by means of friction-rolls $c$ is a frame $d$, upon which is mounted a small electric motor $e$, the terminals $f\ f'$ of which are connected by means of trolleys $f^2\ f^3$ to electric cables $g\ g'$, which receive energy from a stationary electric motor $g^2$. A cut-out consisting of a pivoted lever $h$ and contact-plate $h'$ is attached to the frame, as shown, and interposed in the circuit of the wire $f'$. A cord $j$, attached to the free end of the lever $h$ and trained over a pulley $j'$, is provided with handles $j^2\ j^3$, whereby the lever $h$ may be actuated and the motor started or stopped at will. Upon the motor-shaft is a pulley $e'$, which is connected by means of a belt $e^2$ to a pulley $k$, mounted in a bearing supported by means of a bracket $l$, attached to the frame $d$. The pulley $k$ is attached to a spindle $k'$, which in turn is connected to a flexible shaft $m$, arranged to operate a cloth-cutter $n$ in the usual well-known way. Upon lifting the cutter $n$ and grasping the shaft $m$ the frame $d$ and the motor thereon may be moved as desired and the cutting continued from table to table as fast as the cloth is prepared and the patterns marked thereon.

The devices described are light, simple, and compact, and the advantage of being able to transport the cutter to the work instead of having to move the work thereto is too obvious to require comment.

While said invention is especially applicable to a cloth-cutter, it is obvious that it may be applied in the transmission of power to other light machinery in like manner.

Having thus described my invention, I claim—

The combination, with a suspended track of indefinite length, of an electric motor mounted in a movable frame upon said track, a source of electricity, wires connected with said source of electricity and in operative proximity to said track, electric connections attached to said motor and connected by trolleys with said wires, a flexible shaft connected with said motor, a cloth-cutting machine in operative connection with said shaft, and a switch-lever attached to a cord trained over a pulley upon said movable frame, whereby said cloth-cutting machine may be moved from table to table, the motor transported therewith by means of said flexible shaft and stopped or started by means of said suspended cords in operative proximity to the cutting-machine, substantially as shown and described.

In testimony whereof I have signed this specification, in the presence of two subscribing witnesses, this 26th day of March, 1890.

ELBERT D. WEYBURN.

Witnesses:
D. H. FLETCHER,
J. HALPENNY.